United States Patent
Itoh et al.

(10) Patent No.: US 10,863,142 B2
(45) Date of Patent: Dec. 8, 2020

(54) MONITORING DEVICE AND MONITORING SYSTEM

(71) Applicant: Panasonic Intellectual Property Management Co., Ltd., Osaka (JP)

(72) Inventors: Tomoaki Itoh, Tokyo (JP); Hidehiko Shin, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/139,527

(22) Filed: Sep. 24, 2018

(65) Prior Publication Data

US 2019/0132556 A1    May 2, 2019

Related U.S. Application Data

(63) Continuation of application No. PCT/JP2016/004148, filed on Sep. 12, 2016.

(30) Foreign Application Priority Data

Mar. 25, 2016  (JP) .................. 2016-062031

(51) Int. Cl.
    *H04N 7/18* (2006.01)
    *G08B 13/196* (2006.01)
    (Continued)

(52) U.S. Cl.
    CPC ......... *H04N 7/181* (2013.01); *G06K 9/00268* (2013.01); *G06K 9/00288* (2013.01);
    (Continued)

(58) Field of Classification Search
    None
    See application file for complete search history.

(56) References Cited

U.S. PATENT DOCUMENTS

| 2005/0057653 A1 | 3/2005 | Maruya |
| 2011/0200226 A1 | 8/2011 | Takahata et al. |

(Continued)

FOREIGN PATENT DOCUMENTS

| EP | 2 913 997 | 9/2015 |
| JP | 2003-324720 | 11/2003 |

(Continued)

OTHER PUBLICATIONS

English Translation of International Preliminary Report on Patentability dated Oct. 4, 2018 in International (PCT) Application No. PCT/JP2016/004148.

(Continued)

*Primary Examiner* — Dakshesh D Parikh
(74) *Attorney, Agent, or Firm* — Wenderoth, Lind & Ponack, L.L.P.

(57) ABSTRACT

A monitoring device (2) identifies an object from videos made by a plurality of cameras (1) including a first camera and a second camera and having a predetermined positional relationship. The monitoring device has a receiving unit (21) configured to receive the videos from the plurality of cameras, a storage unit (22b, 22c) configured to store feature information indicating a feature of the object and camera placement information indicating placement positions of the cameras, and a controller (23) configured to identify the object from the videos based on the feature information. If an object has been identifiable from the video made by the first camera but has been unidentifiable from the video made by the second camera, the controller (23) specifies, based on the camera placement information, the object in the video made by the second camera.

7 Claims, 9 Drawing Sheets

(51) Int. Cl.
*G06T 7/254* (2017.01)
*G06K 9/00* (2006.01)
*G06T 1/00* (2006.01)

(52) U.S. Cl.
CPC .......... *G06T 1/0007* (2013.01); *G06T 7/254* (2017.01); *G08B 13/19608* (2013.01); *G08B 13/19645* (2013.01); *H04N 7/18* (2013.01)

(56) References Cited

U.S. PATENT DOCUMENTS

| | | | |
|---|---|---|---|
| 2013/0243246 A1 | 9/2013 | Lao et al. | |
| 2015/0146921 A1 | 5/2015 | Ono et al. | |
| 2016/0055651 A1* | 2/2016 | Oami | G06K 9/00771 348/143 |
| 2016/0104357 A1* | 4/2016 | Miyano | G08B 13/196 348/154 |

FOREIGN PATENT DOCUMENTS

| | | |
|---|---|---|
| JP | 2009-55445 | 3/2009 |
| JP | 2011-170565 | 9/2011 |
| JP | 2013-192154 | 9/2013 |
| JP | WO/2014/171258 * 10/2014 | .......... G06T 7/2033 |
| JP | WO/2014175356 * 10/2014 | .......... G08B 13/196 |
| JP | 2017-174016 | 9/2017 |
| WO | 2013/108686 | 7/2013 |
| WO | 2014/171258 | 10/2014 |
| WO | WO/2014/171258 * 10/2014 | .......... G06T 7/2033 |
| WO | 2015/025490 | 2/2015 |
| WO | 2013/179335 | 1/2016 |

OTHER PUBLICATIONS

International Search Report (ISR) dated Nov. 22, 2016 in International (PCT) Application No. PCT/JP2016/004148.
Supplementary European Search Report dated Feb. 20, 2019 in corresponding European Application No. 16895322.2.
Official Communication dated Jan. 31, 2020 in European Patent Application No. 16 895 322.2.
Official Communication dated Aug. 13, 2020 in European Patent Application No. 16 895 322.2.

* cited by examiner

| PERSON ID | FEATURE BETWEEN I – II | FEATURE BETWEEN II – III |
|---|---|---|
| A | 1.2 | 1.4 |
| B | 1.5 | 1.6 |
| C | 1.7 | 1.2 |
| D | 1.0 | 2.0 |
| E | 2.3 | 1.5 |
| F | 1.7 | 2.1 |

| PERSON ID | CORRECTED PERSON ID | CAMERA | IN | OUT |
|---|---|---|---|---|
| A | — | CAMERA a | 10:10 | 10:11 | — 51
| B | — | CAMERA a | 10:17 | 10:19 |
| C | — | CAMERA a | 10:20 | 10:21 |
| D | — | CAMERA a | 10:32 | 10:36 |
| E | — | CAMERA b | 10:31 | 10:36 |
| F | — | CAMERA b | 10:46 | 10:47 |
| A | — | CAMERA b | 10:23 | 10:30 |
| C | — | CAMERA b | 10:32 | 10:33 |
| A | — | CAMERA c | 10:36 | 10:37 |
| B | — | CAMERA c | 10:41 | 10:42 |
| C | — | CAMERA c | 10:38 | 10:40 |
| D | — | CAMERA c | 10:53 | 10:54 |

| CURRENT | NEXT | SHORTEST (MINUTES) | LONGEST (MINUTES) |
|---|---|---|---|
| CAMERA a | CAMERA b | 10 | 12 |
| CAMERA a | CAMERA d | 9 | 13 |
| CAMERA b | CAMERA c | 5 | 6 |

ESTIMATED TIME PERIOD DURING WHICH CAMERA "b" CAPTURES PERSON
IN : 10:29~10:31
OUT : 10:35~10:36

T2

| PERSON ID | CORRECTED PERSON ID | CAMERA | IN | OUT |
|---|---|---|---|---|
| A | — | CAMERA a | 10:10 | 10:11 |
| A | — | CAMERA b | 10:23 | 10:30 |
| A | — | CAMERA c | 10:36 | 10:37 |
| C | — | CAMERA a | 10:20 | 10:21 |
| C | — | CAMERA b | 10:32 | 10:33 |
| C | — | CAMERA c | 10:38 | 10:40 |
| B | — | CAMERA a | 10:17 | 10:19 |
| B | — | CAMERA c | 10:41 | 10:42 |
| D | — | CAMERA a | 10:32 | 10:36 |
| D | — | CAMERA c | 10:53 | 10:54 |
| E | B | CAMERA b | 10:31 | 10:36 |
| F | D | CAMERA b | 10:46 | 10:47 |

FULL, FULL, DEFICIENT, DEFICIENT, DEFICIENT, DEFICIENT

T3

| CURRENT | NEXT | SHORTEST (MINUTES) | LONGEST (MINUTES) |
|---|---|---|---|
| CAMERA a | CAMERA b | 10 | 12 |
| CAMERA a | CAMERA d | 9 | 13 |
| CAMERA b | CAMERA c | 5 | 8 |

| CANDIDATES | DEGREE OF SIMILARITY OF FEATURE INFORMATION $S_f(A,x)$ | MOVEMENT TIME | | TOTAL SCORE $S(A,x)$ |
|---|---|---|---|---|
| | | CAMERA a → b $t_1$ | CAMERA b → c $t_2$ | |
| B | 0.30 | 3 | 17 | 2.7 |
| C | 0.20 | 10 | 15 | 3.1 |
| D | 0.25 | 5 | 10 | 5.8 |

MONITORING DEVICE AND MONITORING SYSTEM

BACKGROUND

1. Technical Field

The present disclosure relates to a monitoring device and a monitoring system for identifying a person captured by a camera to track the identified person.

2. Related Art

JP 2003-324720 A discloses a monitoring system including a plurality of monitoring cameras. In this monitoring system, each of the monitoring cameras extracts feature information of an object appearing in a video, and transmits the feature information to the other monitoring cameras. This enables the plurality of monitoring cameras to track and monitor the object having the same feature information in cooperation with one another.

SUMMARY

The present disclosure provides a monitoring device and a monitoring system which are effective for accurately tracking an object.

A monitoring device according to the present disclosure identifies an object from videos made by a plurality of cameras including a first camera and a second camera and having a predetermined positional relationship. The monitoring device includes: a receiving unit configured to receive the videos from the plurality of cameras; a storage unit configured to store feature information indicating a feature of the object and camera placement information indicating placement positions of the cameras; and a controller configured to identify the object from the videos based on the feature information. If an object has been identifiable from the video made by the first camera but has been unidentifiable from the video made by the second camera, the controller specifies, based on the camera placement information, the object in the video made by the second camera.

The monitoring device and the monitoring system in the present disclosure are effective for accurately tracking an object.

DETAILED DESCRIPTION OF PREFERRED EMBODIMENTS

Embodiments will be described below in detail with reference to the drawings. In some cases, however, unnecessary detailed description will be omitted. For example, detailed description of well-known matters or repetitive description of substantially identical structures will be omitted in some cases. The reason is that unnecessary redundancy of the following description is to be avoided and a person skilled in the art is to be enabled to make easy understanding. The inventor(s) provides(s) the accompanying drawings and the following description for allowing a person skilled in the art to fully understand the present disclosure and it is not intended that the subject described in claims should be thereby restricted to the accompanying drawings and the following description.

First Embodiment

A first embodiment will be described with reference to the drawings. The present embodiment provides a monitoring system effective for tracking an object even if a situation occurs in which a feature of the object cannot be extracted from some of a plurality of monitoring cameras.

[1. Configuration]

Figure 1:
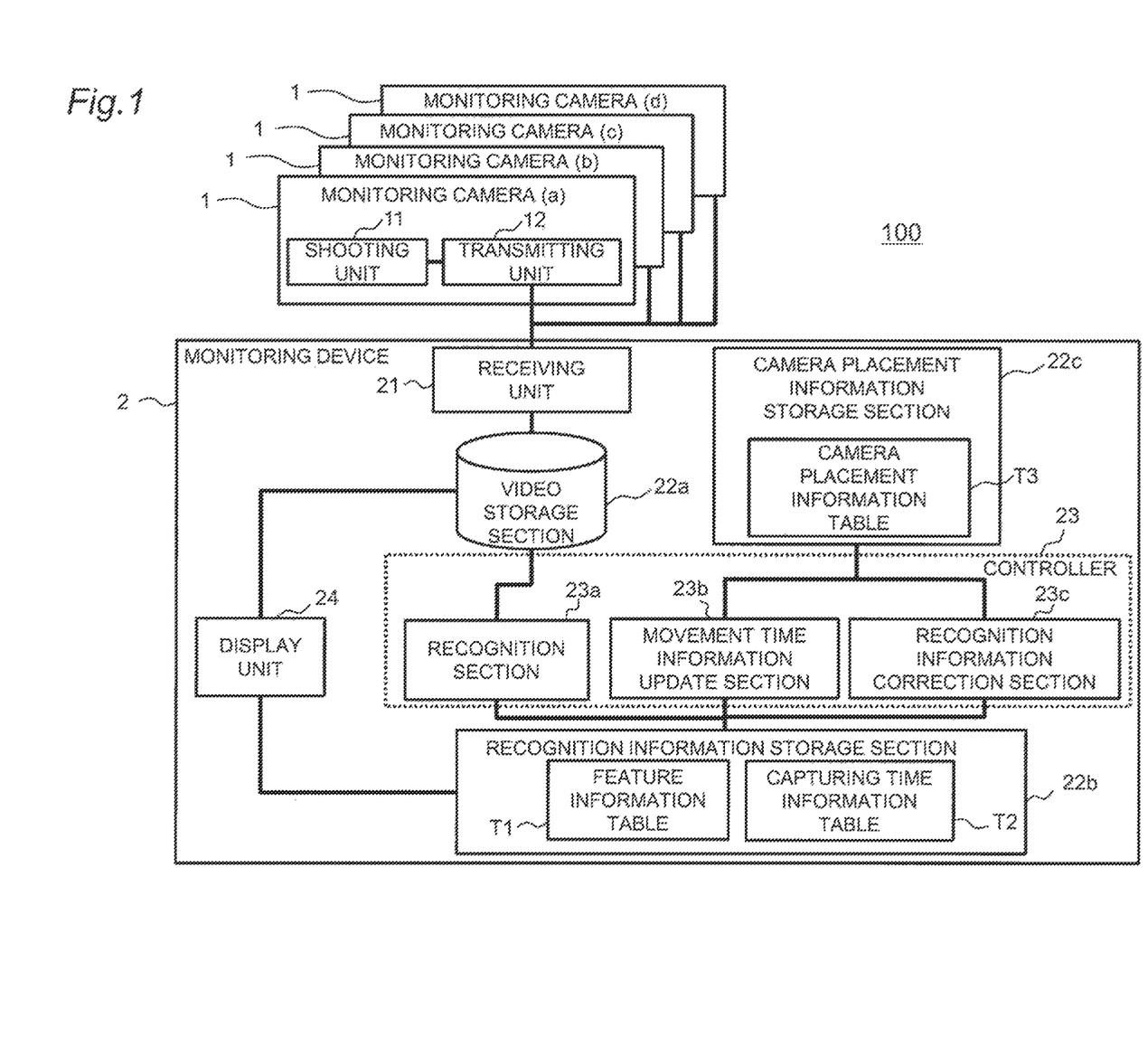
FIG. 1 is a block diagram showing a configuration of a monitoring system of a first embodiment.

FIG. 1 shows a configuration of a monitoring system of the first embodiment. A monitoring system 100 of the present embodiment includes a plurality of monitoring cameras 1 (monitoring cameras "a", "b", "c" and "d"), and a monitoring device 2 which uses videos made by the plurality of monitoring cameras 1 to identify and track a person appearing in the videos.

Each of the monitoring cameras 1 includes a shooting unit 11 which makes a video, and a transmitting unit 12 which transmits, to the monitoring device 2, the video which is made by the shooting unit 11. The shooting unit 11 can include a CCD image sensor, a CMOS image sensor, an NMOS image sensor, or the like. The transmitting unit 12 includes an interface circuit for performing communication with an external instrument in conformity with a predetermined communication standard (for example, LAN, WiFi).

The monitoring device 2 includes a receiving unit 21 which receives the video from each of the monitoring cameras 1, a video storage section 22a which stores the received videos, and a controller 23 which identifies an object (a person in this embodiment) appearing in the videos stored in the video storage section 22a to track the identified object. The receiving unit 21 includes an interface circuit for performing communication with an external instrument in conformity with a predetermined communication standard (for example, LAN, WiFi).

The controller 23 can be made of a semiconductor element or the like. A function of the controller 23 may be configured with only hardware, or may be realized by combining hardware and software. The controller 23 can be, for example, a microcomputer, a CPU, an MPU, a DSP, an FPGA, or an ASIC.

The controller 23 includes a recognition section 23a which identifies the objects appearing in the videos stored in the video storage section 22a. The recognition section 23a extracts features of the objects appearing in the videos stored in the video storage section 22a, and then generates feature information indicating the features. The recognition section 23a generates capturing time information indicating a time period during which the object having the extracted features appears in the video made by the monitoring cameras 1. The feature information and the capturing time information are recognition information obtained by recognizing the object.

The monitoring device 2 further includes a recognition information storage section 22b which stores a feature information table T1 and a capturing time information table T2, and a camera placement information storage section 22c which stores a camera placement information table T3. The feature information table T1 includes feature information of the objects which is generated by the recognition section 23a. The capturing time information table T2 includes capturing time information generated by the recognition section 23a. The camera placement information table T3 includes information indicating placement positions of the monitoring cameras 1 and a time taken for the object to move between the monitoring cameras.

The controller 23 further includes a movement time information update section 23b which calculates the time taken for the object to move between the monitoring cameras based on the capturing time information table T2 to update the camera placement information table T3. The controller 23 includes a recognition information correction section 23c which corrects the capturing time information table T2 based on the feature information table T1 and the camera placement information table T3. The recognition information correction section 23c specifies the monitoring camera 1 which should capture the object based on the camera placement information table T3, and determines whether or not the object appears in the video made by the specified monitoring camera 1. In the case of determining that the object does not appear in the video made by the specified monitoring camera 1 which should capture the object, the recognition information correction section 23c calculates (estimates) a time period during which the uncaptured object should appear in the video made by the monitoring camera 1 based on the time taken for the object to move between the monitoring cameras. Then, the recognition information correction section 23c specifies one among object candidates which appear in the video made by the monitoring camera 1 in the calculated (estimated) time period, as the object determined to be uncaptured, and corrects the capturing time information table T2.

The video storage section 22a, the recognition information storage section 22b, and the camera placement information storage section 22c are the same or different storage sections, each of which can be, for example, a DRAM, a ferroelectric memory, a flash memory, a magnetic disk or the like.

The monitoring device 2 further includes a display unit 24. The display unit 24 is capable of displaying the videos stored in the video storage section 22a, the feature information table T1, and the capturing time information table T2. The display unit 24 can be a liquid crystal display or the like.

[2. Identifying Object (Generation of Capturing Time Information)]

Figure 2:
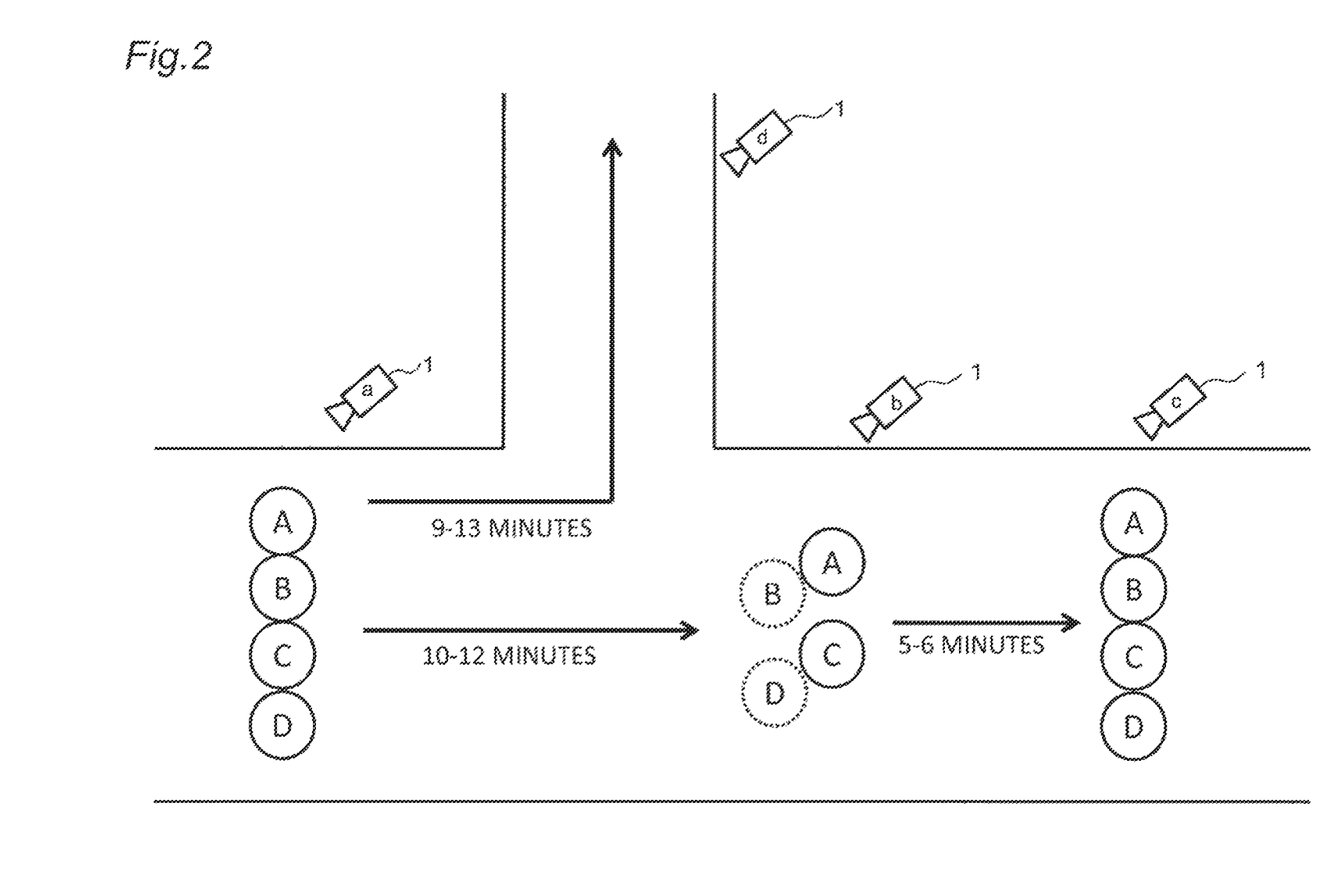
FIG. 2 is a diagram showing a placement example of a plurality of monitoring cameras in the first embodiment.

FIG. 2 shows a placement example of the monitoring cameras 1. The monitoring cameras 1 are provided, for example, in shops. The four monitoring cameras 1 (monitoring cameras "a", "b", "c" and "d") are arranged at different places. In FIG. 2, the monitoring cameras "a", "b" and "c" are disposed in order of a traveling direction (a direction from a left side to a right side in FIG. 2). The number of monitoring cameras 1 and placement locations thereof are merely examples and are appropriately changeable. Each of the monitoring cameras 1 transmits the video which is made by the shooting unit 11, from the transmitting unit 12 to the monitoring device 2. The transmitted videos are stored in the video storage section 22a of the monitoring device 2.

Figure 3:
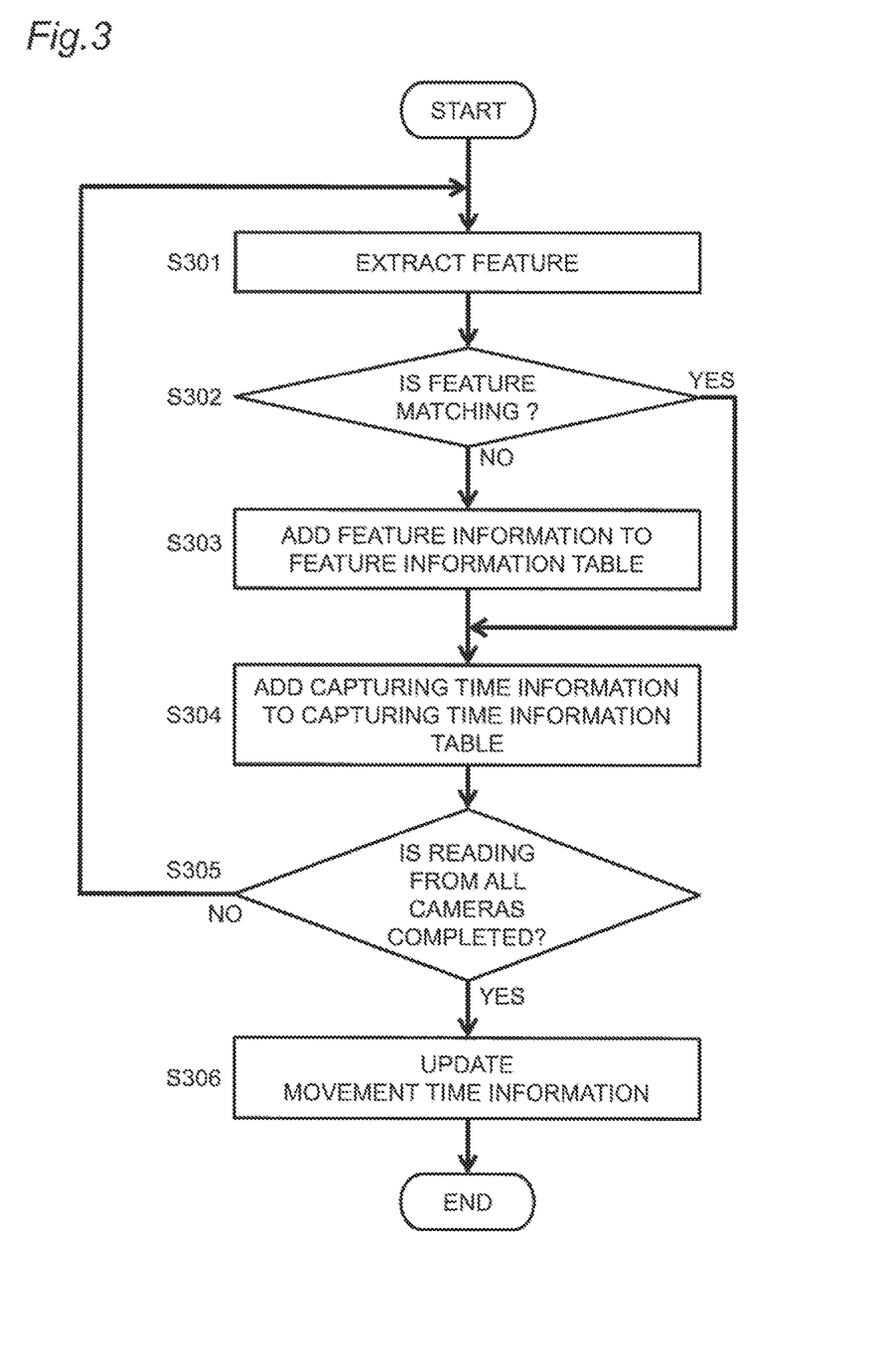
FIG. 3 is a flowchart for explaining operations of identifying a person and calculating a moving time between the monitoring cameras in the first embodiment.

FIG. 3 shows a process for identifying a person and calculating a movement distance between the monitoring cameras, the process being performed by the controller 23. The controller 23 performs the process for identifying a person, which is shown in FIG. 3, at predetermined timing. For example, the predetermined timing may be when the user gives an instruction to the monitoring device 2, or may be every predetermined time (for example, 24 hours). Hereinafter, a description will be given of the case where the monitoring cameras 1 capture persons who move in the traveling directions indicated by arrows in FIG. 2.

Figure 4A:
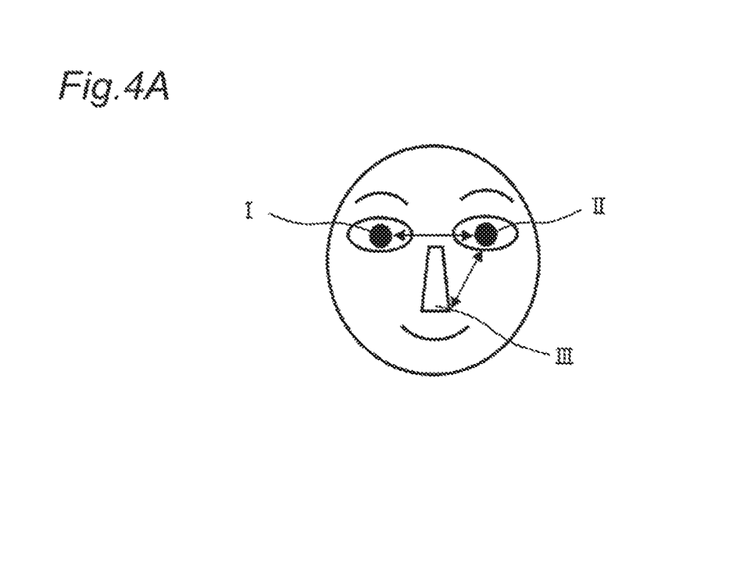
FIG. 4A is a diagram for explaining feature extraction of a person.
Figure 4B:
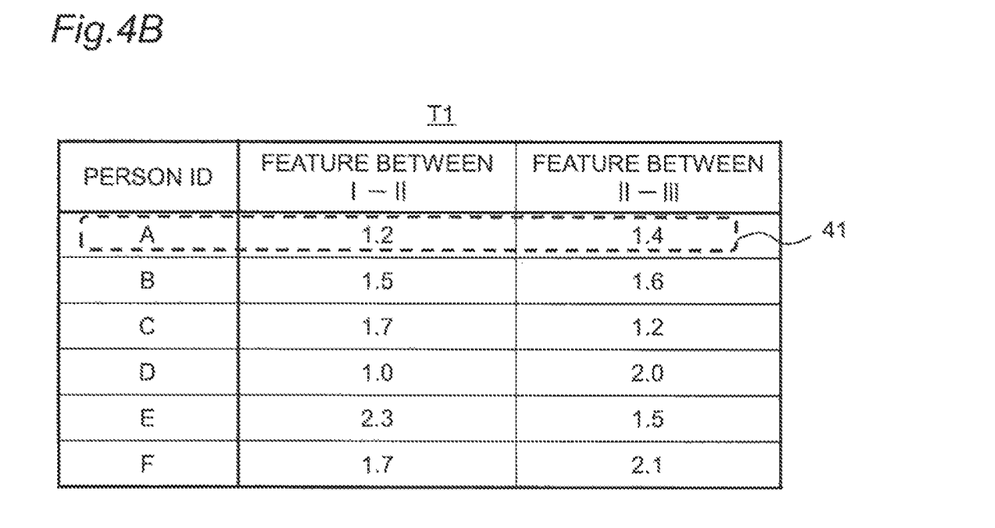
FIG. 4B is a diagram showing an example of a feature information table in the first embodiment.

The recognition section 23a reads out the video stored in the video storage section 22a, and extracts the features of the person appearing in the video (S301). For example, the recognition section 23a analyzes the video in order from the video made by the monitoring camera "a". For example, the recognition section 23a extracts a shape, color, size, or position of a part of a face as a feature of the person. FIG. 4A shows an example of feature extraction of a person, and FIG. 4B shows an example of the feature information table T1. For example, the recognition section 23a extracts, as the features of the person, a distance (distance of "I-II") between both eyes and a distance (distance of "II-III") between one eye and a nose, as shown in FIG. 4A, and adds feature information 41 which includes the extracted feature (distances), to the feature information table T1 as shown in FIG. 4B.

At this time, the recognition section 23a determines whether or not feature information 41 indicating the feature matching the extracted feature is already present in the feature information table T1 (S302). If the feature information 41 indicating the matching feature is not present, the recognition section 23a determines that a new person is extracted from the video, and generates identification information (ID) for identifying the person. Then, the recognition section 23a adds, to the feature information table T1, such feature information 41 which includes the generated identification information and the feature (the distance of "I-II" and the distance of "II-III") of the person (S303).

Figure 5:
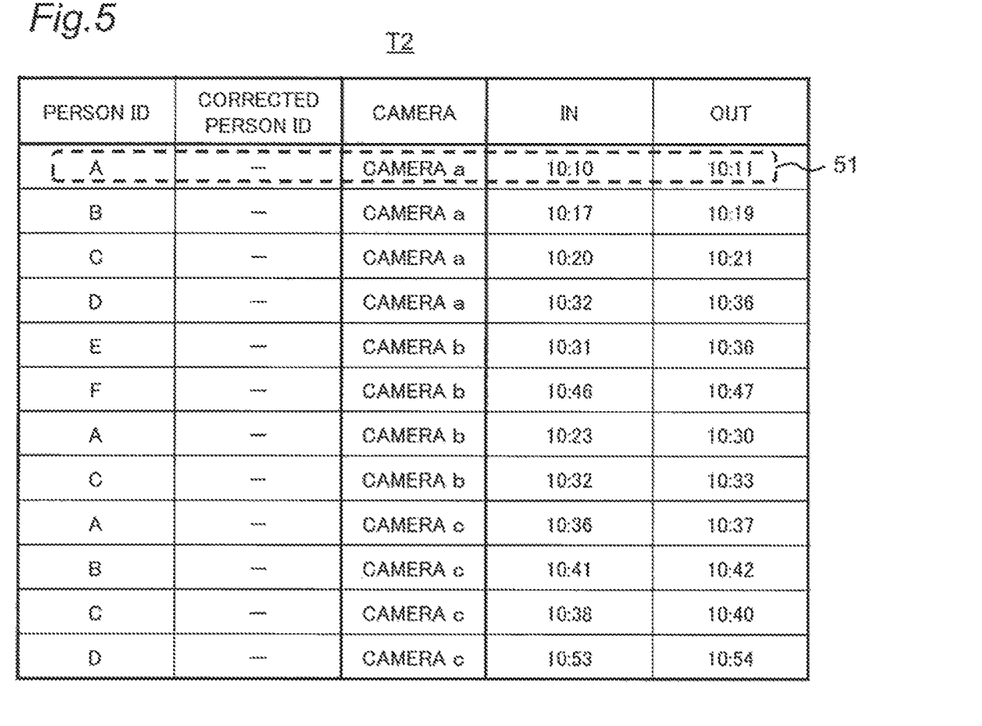
FIG. 5 is a diagram showing an example of a capturing time information table in the first embodiment.

The recognition section 23a generates capturing time information indicating a time when the person appeared in the video made by the monitoring camera 1 and indicating the monitoring camera 1 which captured the person, and adds the capturing time information to the capturing time information table T2 (S304). FIG. 5 shows an example of the capturing time information table T2. The capturing time information 51 includes identification information (ID) of persons, identification information of the monitoring cameras 1 which captured the persons, a time (IN time) when each of the persons began to appear in the video made by the monitoring camera 1, and a time (OUT time) when each of the persons finished appearing.

The recognition section 23a determines whether or not reading of the videos from all the monitoring cameras 1 is completed (S305). If the reading is not completed, the recognition section 23a repeats the processing of steps S301 to S304 for the videos of the remaining monitoring cameras 1.

Figure 6:
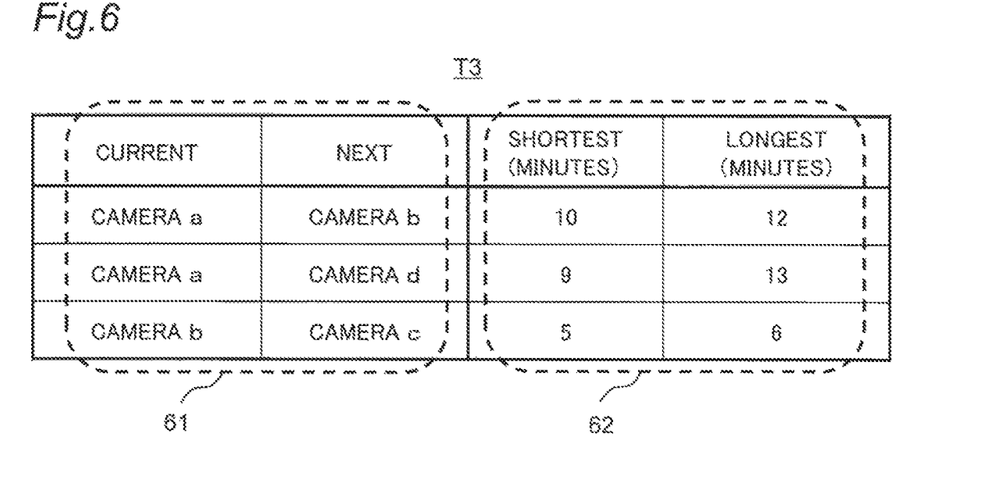
FIG. 6 is a diagram showing an example of a camera placement information table in the first embodiment.

When the recognition section 23a finishes extracting the persons from the videos of all the monitoring cameras 1, the movement time information update section 23b updates the camera placement information table T3 based on the capturing time information table T2 generated by the recognition section 23a (S306). FIG. 6 shows an example of the camera placement information table T3. The camera placement information table T3 includes placement information 61 indicating the placement positions of the monitoring cameras 1, and movement time information 62 indicating the time taken for the persons to move between the monitoring cameras 1. The placement information 61 includes identification information of "current camera (current)" and "next camera (next)" which captures persons when the persons advance along movement paths (in the traveling directions indicated by the arrows in FIG. 2). The placement information 61 is input in advance. For example, when each of the monitoring cameras 1 is installed, the placement information 61 is input by the user. The movement time information 62 includes information on a shortest time and a longest time, which are taken for the person to move from the "current camera" to the "next camera". The movement time information update section 23b updates the shortest time and longest time in the camera placement information table T3 based on the IN time and the OUT time in the capturing time information table T2. It should be noted that the update is not limited to the timing of the step S306 and the movement time information update section 23b may update the movement time information 62 of the camera placement information table T3 periodically.

In this manner, the person can be identified by extracting the features of the person captured on the videos made by the monitoring cameras 1. The monitoring camera 1 which captured the identified person and a time when the monitoring camera 1 captured the person can be recognized by referring to the capturing time information table T2. Therefore, it is possible to track the person using the videos of the plurality of monitoring cameras 1.

[3. Specifying Object (Correction of Capturing Time Information)]

Depending on an angle and lighting conditions at the time of capturing, the same person may appear differently in the video. Therefore, features of the same person which are extracted from the videos made by the plurality of monitoring cameras 1 may not coincide with one another. For example, videos to be made differ largely between the monitoring camera 1 installed at a high position in a bright place and the monitoring camera 1 installed at a low position in a dark place, and accordingly, features of the person which are extracted from the videos made by these cameras may differ therebetween. In this case, different features may be extracted from even the same person, and therefore the same person is recognized as another person. Therefore, even when the same person passes in front of the plurality of monitoring cameras 1 (for example, the monitoring cameras "a", "b" and "c") in order, some of the monitoring cameras 1 (for example, the monitoring camera "b") cannot extract the same features of the person, and the tracking of the same person may be interrupted.

In view of this, in the present embodiment, in order that the same person can be tracked even if there occurs a situation where the features of the same person cannot be extracted from a part of the videos made by the plurality of monitoring cameras 1, the same person is selected from among the persons who are determined to be different persons since the features thereof do not coincide with one another, using the camera placement information table T3, and thus the capturing time information table T2 is corrected.

Figure 7:
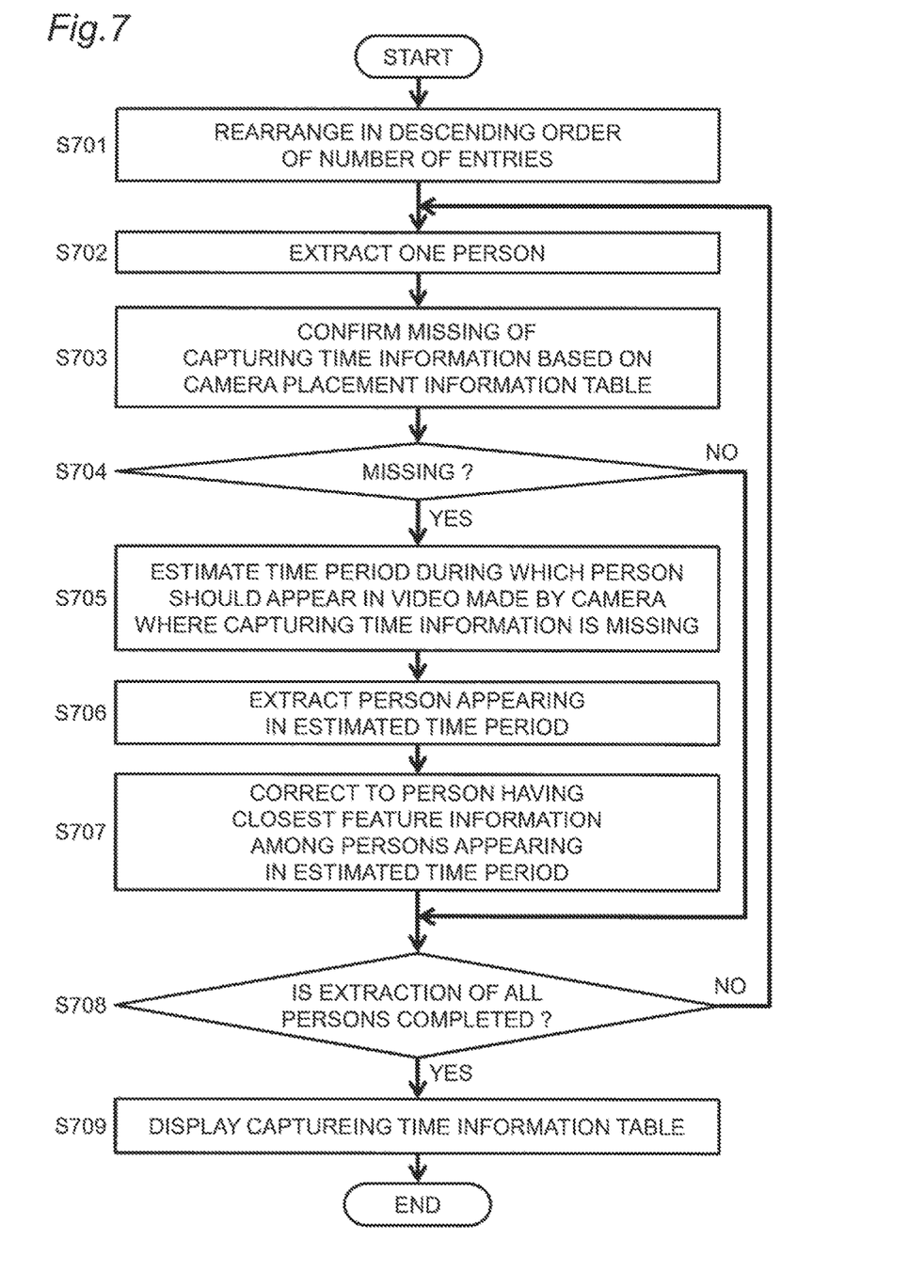
FIG. 7 is a flowchart for explaining operations of correcting the capturing time information table in the first embodiment.
Figure 8:
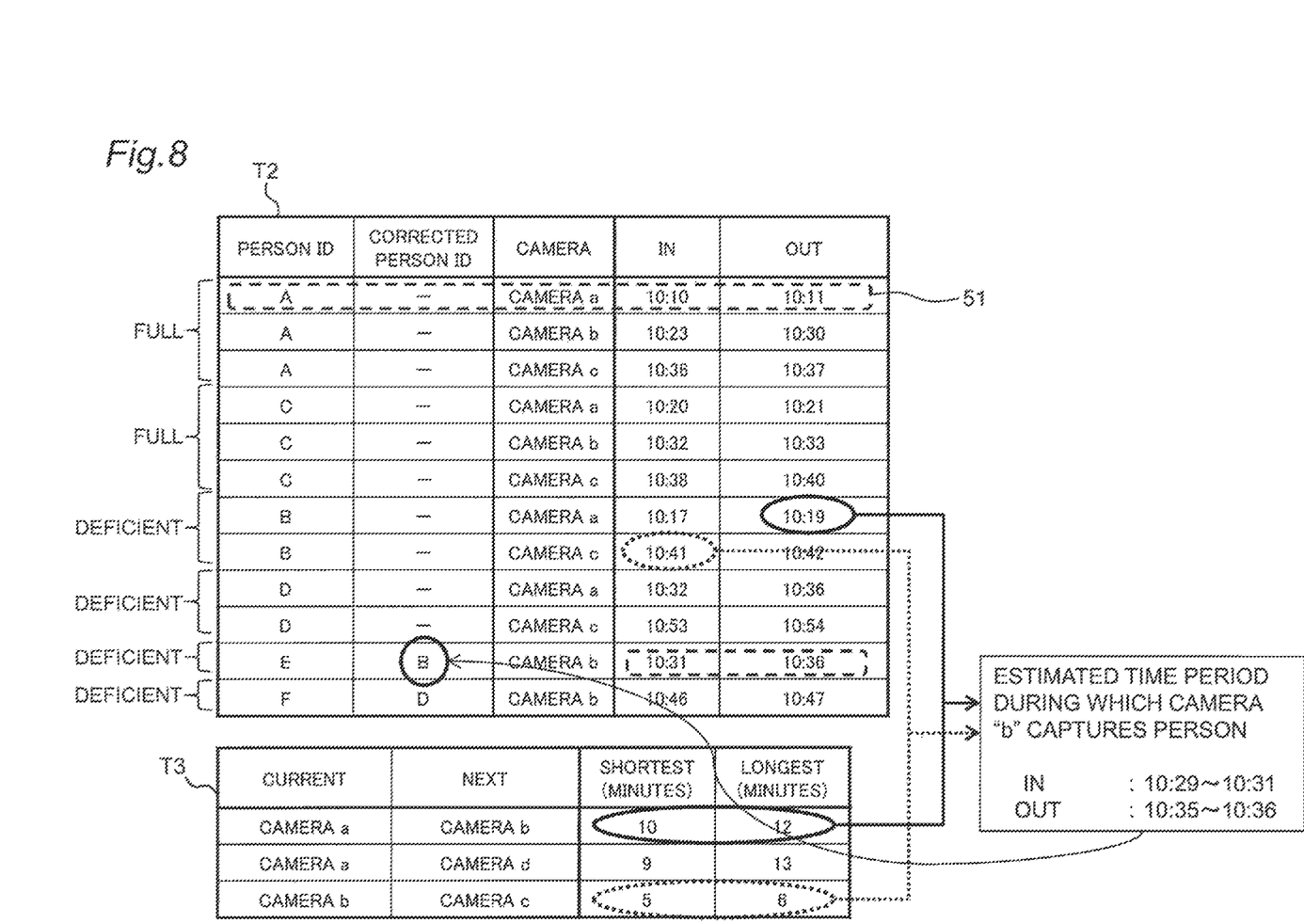
FIG. 8 is a diagram for explaining correction of capturing time information in the first embodiment.

FIG. 7 shows a process for correcting the capturing time information table T2 by the recognition information correction section 23c. The recognition information correction section 23c reads out the capturing time information table T2, and rearranges the persons in a descending order of the number of entries of the persons (S701). FIG. 8 shows the capturing time information table T2 after the rearrangement. The recognition information correction section 23c extracts one person in the descending order of the number of entries (S702), then refers to the camera placement information table T3, and confirms whether or not the capturing time information 51 is missing with respect to the extracted person (S703). Whether or not the capturing time information 51 is missing is confirmed by referring to the placement information 61 of the camera placement information table T3 and by specifying the monitoring camera 1 which should capture the person. In such a placement example of the monitoring cameras 1 as shown in FIG. 2, if the person proceeds in the traveling directions indicated by the arrows in FIG. 2, the person is captured by the monitoring camera "b" or the monitoring camera "d" after the monitoring camera "a", and is captured by the monitoring camera "c" after the monitoring camera "b". By referring to the placement information 61 of the camera placement information table T3, the recognition information correction section 23c can determine that the person should be captured by the monitoring camera "b" without fail before the person is captured by the monitoring camera "c". That is, when the capturing time information 51 of the monitoring camera "c" is present, the monitoring camera "b" is specified as the monitoring camera 1 which should capture the person, and it is confirmed whether or not the capturing time information 51 of the monitoring camera "b" is present. In this manner, it is determined whether the capturing time information 51 is missing.

If the capturing time information 51 is not missing (No at S704), it is determined whether or not the confirmation is completed as to whether or not the capturing time information 51 is missing, for all persons recorded in the capturing time information table T2 (S708). If the confirmation is not completed (No at S708), the processing returns to the step S702 to newly extract a next person from the capturing time information table T2 and confirm whether or not the capturing time information 51 is missing.

If the capturing time information 51 is missing (Yes at S704), the recognition information correction section 23c refers to the capturing time information table T2 and the camera placement information table T3, and estimates (calculates) a time period during which the person should appear in the video made by the monitoring camera 1 where the capturing time information 51 is missing (S705). For example, as shown in FIG. 8, regarding the person "B", the capturing time information 51 of the monitoring camera "b" is missing. The recognition information correction section 23c estimates a time period (10:29 to 10:31) during which the person "B" starts to appear in the video made by the monitoring camera "b" based on an OUT time (10:19) of the person "B" from the monitoring camera "a" in the capturing time information table T2, and the shortest time (10 minutes) and the longest time (12 minutes) which are taken to move from the monitoring camera "a" to the monitoring camera "b" in the camera placement information table T3. Moreover, the recognition information correction section 23c estimates a time period (10:35 to 10:36) during which the person "B" finishes appearing in the video made by the monitoring camera "b" based on an IN time (10:41) of the person "B" to the monitoring camera "c" indicated in the capturing time information table T2, and the shortest time (5 minutes) and the longest time (6 minutes) which are taken to move from the monitoring camera "b" to the monitoring camera "c" indicated in the camera placement information table T3.

The recognition information correction section 23c extracts the person appearing in the estimated time period from the capturing time information table T2 (S706). In the example of FIG. 8, an IN time (10:31) of the person "E" to the monitoring camera "b" is included in an estimated time period (10:29 to 10:31) during which the person starts to appear, and an OUT time (10:36) of the person "E" from the monitoring camera "b" is included in an estimated time period (10:35 to 10:36) during which the person finishes appearing. Accordingly, the recognition information correction section 23c extracts the person "E". At this time, the recognition information correction section 23c extracts the person "E" from persons for which the capturing time information 51 is missing. If the number of extracted persons is one, then the person (person "E") is determined to be the same person (person "B"), and the capturing time information table T2 is corrected. In the example of FIG. 8, the identification information of the person "B" is recorded in "corrected person identification information (ID)" on the person "E".

When there are a plurality of persons appearing in the estimated time period, the recognition information correction section 23c determines that a person having the closest feature information 41 is the same person based on the feature information table T1, and corrects the capturing time information table T2 (S707).

It is determined whether or not the confirmation is completed as to whether or not the capturing time information 51 is missing, for all persons recorded in the capturing time information table T2 (S708). If the confirmation is not completed (No at S708), the processing returns to the step S702 to newly extract a next person from the capturing time information table T2 and confirm whether or not the capturing time information 51 is missing. When the confirmation as to whether or not the capturing time information 51 is missing is completed for all the persons recorded in the capturing time information table T2, the recognition information correction section 23c displays the capturing time information table T2 on the display unit 24 (S709). The user can confirm that the person captured by the plurality of monitoring cameras 1 can be tracked by referring to the corrected capturing time information table T2 displayed on the display unit 24.

In this manner, the recognition information correction section 23c compensates for the missing of the capturing time information 51 using the feature information table T1, the capturing time information table T2, and the camera placement information table T3. For example, as shown in FIG. 8, the recognition information correction section 23c corrects the person "E" as the person "B", thereby compensating for the capturing time information 51 of the monitoring camera "b" for the person "B". As a result, the controller 23 becomes capable of tracking the person "B" from the videos made individually from the monitoring camera "a", the monitoring camera "b" and the monitoring camera "c" in this order by referring to the corrected capturing time information table T2.

[4. Effects]

As described above, the monitoring device 2 according to the present embodiment identifies an object from the videos made by the plurality of monitoring cameras 1 which include a first camera (the monitoring camera "c") and a second camera (the monitoring camera "b") and have a predetermined positional relationship. The monitoring device 2 includes: the receiving unit 21 configured to receive the videos from the plurality of monitoring cameras 1; the recognition information storage section 22b configured to store the feature information 41 indicating the features of the object; the camera placement information storage section 22c configured to store the placement information 61 indicating the placement positions of the cameras; and the controller 23 configured to identify the object from the videos based on the feature information 41. If an object has been identifiable from the video made by the first camera (the monitoring camera "c") but has been unidentifiable from the video made by the second camera (the monitoring camera "b"), the recognition information correction section 23c of the controller 23 specifies, based on the placement information 61, the object in the video made by the second camera (the monitoring camera "b"). In this manner, the object which has been unidentifiable by the feature information 41 is specified using the placement information 61, and accordingly, the tracking of the object can be realized with high accuracy.

The movement time information update section 23b of the controller 23 calculates the movement time of a person between the first camera and the second camera, calculates the time period during which the object passed through a shooting region of the second camera based on the calculated movement time and the time when the object was captured by the first camera, and specifies the object in the video made by the second camera in the calculated time period. Specifically, the capturing time information 51 indicating the time period during which each object identified based on the feature information 41 appears in the monitoring camera 1 is generated, and the time taken for the object to move between the monitoring cameras 1 is calculated based on the generated capturing time information 51. Moreover, the controller 23 specifies, based on the placement information 61, the monitoring camera 1 which should capture each object, estimates the time period during which the object which does not appear in the video made by the specified monitoring camera 1 should appear therein based on the calculated time taken for the object to move between the monitoring cameras when the object is not captured by the specified monitoring camera 1, specifies that the other object appearing in the video made by the specified monitoring camera 1 in the estimated time period is the uncaptured object with reference to the capturing time information 51, and rewrites the capturing time information 51. As a result, even when pieces of the feature information 41 do not coincide with one another and the capturing time information 51 is missing, the capturing time information 51 that is missing can be compensated for by referring to the camera placement information table T3 including the placement information 61 and the movement time information 62. Therefore, even when the feature information 41 of an object (person), which is acquired from the video made by a part of the monitoring cameras 1, is not acquired from the video made by the other monitoring camera 1, and the object is recognized as the other object (person) in the video made by the other monitoring camera 1, it can be newly recognized that the objects (persons) in both of the videos are the same object (person) by referring to the camera placement information table T3. Hence, the tracking of the object (person) can be realized with high accuracy.

Moreover, when two or more object candidates appear in the video made by the second camera in the calculated time period, the controller 23 specifies one of the two or more object candidates as the object based on the feature information 41. In this manner, even when two or more object candidates appear in the video, the object determined not be appearing can be specified from the object candidates with high accuracy.

Furthermore, the controller 23 extracts the features of the object from the video received by the receiving unit 21, generates the feature information 41, and stores the generated feature information 41 in the recognition information storage section 22b. This makes it possible to identify and track an object even if a feature of the object is newly extracted.

The monitoring system 100 of the present embodiment includes: the plurality of monitoring cameras 1 which include the first and second cameras and have a predetermined positional relationship; and the monitoring device 2 which has the feature information 41 indicating the features of the object and the placement information 61 indicating the placement positions of the monitoring cameras 1, then based on the feature information 41, identifies the object from the videos made by the plurality of monitoring cameras 1, and based on the placement information 61, specifies an object in the video made by the second camera if the object has been identifiable from the video made by the first camera but has been unidentifiable from the video made by the second camera. If the monitoring system 100 of the present embodiment is used, the object (person) can be tracked with high accuracy, and accordingly, the monitoring system 100 of the present embodiment is useful for flow line visualization and flow line analysis. For example, an entire flow line can be estimated using the videos of the monitoring cameras 1 provided locally. Moreover, the monitoring system 100 is also useful for simulating changes in flow line and for analyzing a value of a shop area.

Other Embodiments

The first embodiment has been described above as an example of the technique to be disclosed in the present application. The technique in the present disclosure is not restricted to the first embodiment, but can also be applied to embodiments in which change, replacement, addition, and omission are properly performed. Moreover, it is also possible to make a new embodiment by combining the respective components described in the first embodiment. Therefore, other exemplary embodiments will be described below.

Another example of the time period estimation (S705) and the person extraction (S706) will be described. In the example of FIG. 8, the recognition information correction section 23c may refer to the capturing time information table T2 and the camera placement information table T3, and may extract a person appearing in the video made by the monitoring camera "b" in any time period (for example, 10:32 to 10:35) within a period from a lower limit time (10:29) of the time period when the person "B" starts to appear in the video made by the monitoring camera "b" to an upper limit time (10:36) of the time period when the person "B" finishes appearing therein (S706). Moreover, when the person cannot be extracted in this estimated time period, a first predetermined time (for example, 3 minutes) may be subtracted from the lower limit time (10:29) of the estimated time period during which the person "B" starts to appear, and a second predetermined time (for example, 3 minutes) may be added to the upper limit time (10:36) of the estimated time period during which the person "B" finishes appearing, whereby a new time period (10:26 to 10:39) may be calculated, and a person appearing in the video made by the monitoring camera "b" may be extracted in any time period (for example, 10:28 to 10:34) within the new time period (10:26 to 10:39).

Another example of the processing (S707) for extracting the most similar person from a plurality of persons will be described. For example, in accordance with the sum of a degree of similarity based on the feature information 41 and a degree of appearance based on a probability distribution of the time taken to move between the monitoring cameras, the most similar person may be extracted from among the plurality of persons. Hereinafter, a description will be given of a case where the person "A" cannot be detected from the video made by the monitoring camera "b" in FIG. 2 and the person "A" is searched out from the persons B, C and D appearing in the video made by the monitoring camera "b". In this case, the degree of similarity $S_f(A, x)$ based on the feature information and the degree of appearance $S_{ab}(t_1)$, $S_{bc}(t_2)$ based on the probability distribution of the time taken for the person to move between the monitoring cameras are functionalized. Then, a person whose total value (total score) $S(A, x)$ of the degree of similarity $S_f(A, x)$ and the degree of appearance $S_{ab}(t_1)$, $S_{bc}(t_2)$ satisfies a predetermined condition is determined to be the person "A". The total value $S(A, x)$ is shown in Expression (1) below. For example, a person having the highest total value $S(A, x)$ is determined to be the person "A".

$$S(A,x)=S_f(A,x)+\alpha S_{ab}(t_1)+\beta S_{bc}(t_2) \tag{1}$$

(x is the person "B", "C" or "D")

($S_f(A, x)$ is the degree of similarity between the feature information of the person "A" and feature information of a person x)

($\alpha$ and $\beta$ are predetermined weighting coefficients)

($t_1$ is a time since the person "A" appears in the video made by the monitoring camera "a" until the person x appears in the video made by the monitoring camera "b")

($t_2$ is the time until the person "A" appears in the video made by the monitoring camera "c" after the person x appears in the video made by the monitoring camera "b")

($S_{ab}(t)$ is the degree of appearance based on the time taken for the person to move from the monitoring camera "a" to the monitoring camera "b" and a distribution of appearance frequencies of the person)

($S_{bc}(t)$ is the degree of appearance based on the time taken for the person to move from the monitoring camera "b" to the monitoring camera "c" and the distribution of the appearance frequencies of the person)

Figure 9A:
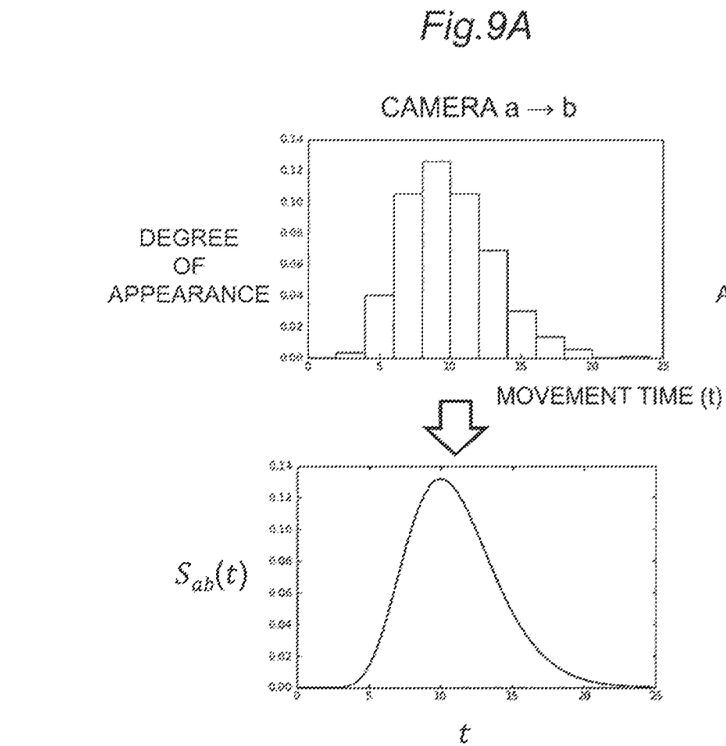
FIGS. 9A and 9B are diagrams for explaining scoring of distributions of a number of people moving among a plurality of monitoring cameras in another embodiment.
Figure 9B:
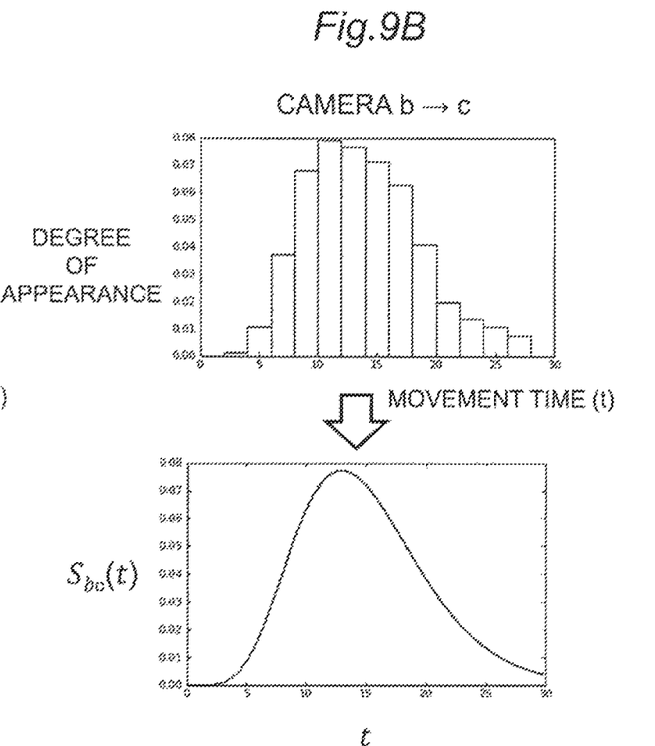

FIG. 9A shows an example of the degree of appearance $S_{ab}(t)$. The degree of appearance $S_{ab}(t)$ is a result of functionalizing the distribution of the appearance frequencies of the person for each time until the person starts to appear in the video made by the monitoring camera "b" after the person no longer appears in the video made by the monitoring camera "a" (that is, the time taken for the person to move from the monitoring camera "a" to the monitoring camera "b"). FIG. 9B shows an example of the degree of appearance $S_{bc}(t)$. The degree of appearance $S_{bc}(t)$ is a result of functionalizing the distribution of the appearance frequencies of the person for each time until the person starts to appear in the video made by the monitoring camera "c" after the person no longer appears in the video made by the monitoring camera "b" (that is, the time taken for the person to move from the monitoring camera "b" to the monitoring camera "c"). The recognition information correction section 23c calculates the appearance frequencies of the person for each time taken for the person to move between the monitoring cameras with reference to the capturing time information table T2, and generates the functions $S_{ab}(t)$ and $S_{bc}(t)$ of the degrees of appearances as shown in FIGS. 9A and 9B based on the time taken for the person to move between the monitoring cameras and the calculated appearance frequencies of the person.

Figure 10:
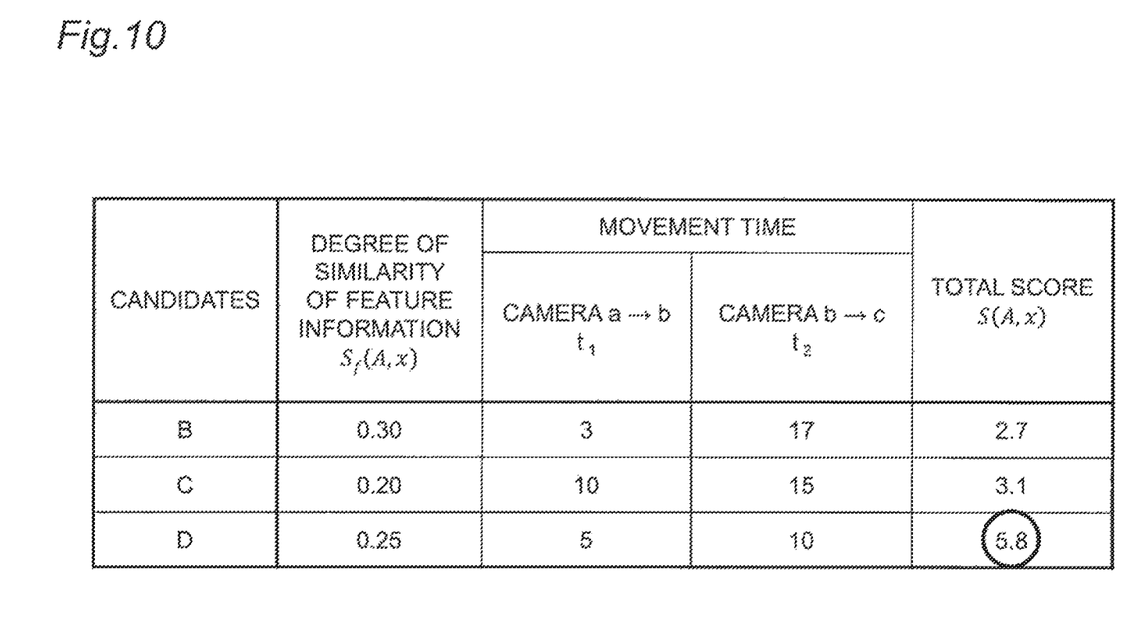
FIG. 10 is a diagram for explaining candidate selection based on a degree of similarity between persons in another embodiment.

FIG. 10 shows examples of numerical values of the degrees of similarity $S_f(A, x)$ to the feature information of the person "A", time t1 after the person "A" is captured by the monitoring camera "a" until the person x (x="B", "C", "D") is captured by the monitoring camera "b", time t2 after the person x (x="B", "C", "D") is captured by the monitoring camera "b" until the person "A" is captured by the monitoring camera "c", and total values S(A, x). FIG. 10 shows an example in which the numerical values of the total value S(A, x) indicated by the above Expression (1) are obtained individually by the numerical values of $S_f(A, x)$, $t_1$ and $t_2$. In the example of FIG. 10, the total value S(A, x) of the person "D" is the highest, and therefore, the person "D" is determined to be the person "A".

Note that the functions $S_{ab}(t)$ and $S_{bc}(t)$ may be changed depending on the person, the time period, the situation of the shop, and the like. For example, the functions $S_{ab}(t)$ and $S_{bc}(t)$ may be generated every time period (9:00 to 10:00 or the like) based on the current time.

In the person extraction (S706), when there is only one person in the estimated time period, the recognition information correction section 23c may compare the feature information 41 of the person (person "B") whose capturing time information 51 is missing with the feature information 41 of the person (person "E") appearing in the estimated time period. Then, when both pieces of the feature information 41 are not similar to each other, the recognition information correction section 23c may determine that the person (person "B") whose capturing time information 51 is missing and the person (person "E") appearing in the estimated time period are different persons, and does not need to correct the capturing time information table T2.

The monitoring system 100 of the present disclosure can be composed by cooperation among hardware resources, for example, such as a processor, a memory, and a program.

As described above, the embodiments have been described as illustrative for the technique in the present disclosure. For this purpose, the accompanying drawings and the detailed description have been provided. Accordingly, the components described in the accompanying drawings and the detailed description may include components which are indispensable to solve the problems as well as components which are not indispensable to solve the problems in order to illustrate the technique. For this reason, the non-indispensable components should not be approved to be indispensable immediately based on the description of the non-indispensable components in the accompanying drawings or the detailed description.

Moreover, the embodiments serve to illustrate the technique in the present disclosure. Therefore, various changes, replacements, additions, omissions, and the like can be made within the claims or equivalents thereof.

INDUSTRIAL APPLICABILITY

The present disclosure is applicable to a monitoring device which tracks an object using a plurality of monitoring cameras and to a monitoring system including the monitoring device.

What is claimed is:

1. A monitoring device which identifies an object from videos made by a plurality of cameras and having a predetermined positional relationship, the plurality of cameras being disposed at placement positions to capture shooting regions along a movement path of the object, the monitoring device comprising:

a receiving unit configured to receive the videos from the plurality of cameras;

a storage unit configured to store feature information indicating a feature of the object, capturing time information indicating a time period during which the object and an object candidate appear in the videos made by the plurality of cameras and camera placement information indicating the placement positions of the plurality of cameras; and a controller configured to identify the object from the videos based on the feature information and the capturing time information, when the placement positions of first, second, and third cameras included in the plurality of cameras are such that the object passes through the shooting region of the first camera after the shooting region of the second camera and the object passes through the shooting region of the second camera after the shooting region of the third camera, wherein the controller calculates a first movement time of the object between the first camera and the second camera and a second movement time of the object between the second camera and the third camera, the controller subtracts the calculated first movement time from a capturing starting time at which the first camera started to capture the object, calculates a time period during which the object passed through the shooting region of the second camera, when two or more object candidates appear in the video made by the second camera in the calculated time period, the controller specifies one of the two or more object candidates as the object based on the feature information, and when the controller cannot specify the object based on the feature information, the controller specifies an object candidate as the object based on a total score S(A, x) that is calculated by an expression (1) with a degree of similarity $S_f(A, x)$ based on the feature information and a degree of appearance $S_{ab}(t1)$ based on a probability distribution of the time taken for the object to move between the third and second cameras and a degree of appearance $S_{bc}(t2)$ based on a probability distribution of the time taken for the object to move between the second and first cameras; and the controller corrects the capturing time information based on the object candidate that is specified as the object, wherein $S(A, x) = S_f(A, x) + \alpha S_{ab}(t1) + \beta S_{bc}(t2)$ is the expression (1), and $\alpha$, $\beta$ are predetermined weighting coefficients.

2. The monitoring device according to claim 1, wherein when the placement position of the plurality of cameras is such that the object passes through the shooting region of the second camera after the shooting region of the first camera, the controller adds the calculated movement time to a capturing ending time at which the first camera finished capturing the object, calculates the time period during which the object passed through the shooting region of the second camera, and specifies the object in the video made by the second camera in the calculated time period.

3. The monitoring device according to claim 1, wherein the controller extracts the feature of the object from the videos received by the receiving unit to generate the feature information, and stores the feature information in the storage unit.

4. The monitoring device according to claim 1, wherein, when an object candidate does not appear in the video made by the second camera in the calculated time period, the controller calculates a new time period by subtracting a first predetermined time from a starting time of the calculated time period or by adding a second predetermined time to an ending time of the calculated time period.

5. The monitoring device according to claim 1, wherein, when two or more object candidates appear in the video made by the second camera in the calculated time period, the controller specifies one of the two or more object candidates as the object based on a probability distribution of the movement time between the first camera and the second camera.

6. The monitoring device according to claim 1, wherein the controller specifies, based on the total score, the object candidate which has appeared in the video made by the second camera but has not appeared in the video made by the first camera in the object candidates recorded in the capturing time information as an object candidate which has appeared in the video made by the first camera but has not appeared in the video made by the second camera.

7. A monitoring system comprising:
a plurality of cameras including a first camera and a second camera and having a predetermined positional relationship, the first camera and the second camera being disposed at placement positions to capture shooting regions along a movement path of an object; and
the monitoring device according to claim 1, which has feature information indicating a feature of the object and camera placement information indicating the placement positions of the plurality of cameras, the monitoring device identifying, based on the feature information, the object from videos made by the plurality of cameras, the monitoring device specifying, based on the camera placement information, the object in the video made by the second camera if the object has been identifiable from the video made by the first camera but has been unidentifiable from the video made by the second camera.

* * * * *